Patented Aug. 15, 1939

2,169,577

UNITED STATES PATENT OFFICE 2,169,577

LIQUID COATING COMPOSITION

Theodore F. Bradley, Westfield, N. J., assignor to American Cyanamid Company, New York, N. Y., a corporation of Maine No Drawing. Application June 27, 1936,
Serial No. 87,734

7 Claims. (Cl. 134—11)

This invention relates to coating compositions derived from aluminum and iron soaps which have been found to possess the interesting and valuable characteristic of undergoing conversion from the fusible and soluble form to an infusible and insoluble form upon exposure to the oxygen of the air.

The object of this invention is to produce new and useful coating compositions for application to or in paints, varnishes, enamels, inks, linoleum, coated textiles and paper and the like.

I have found that when aluminum or iron is combined with certain unsaturated organic acids, metallic soaps are formed which, while initially soluble in various organic solvents and of fusible nature, are capable of reacting with oxygen to become infusible and insoluble. In this latter form these soaps have considerable utility.

Salts or soaps derived from various polyvalent metals including aluminum and various saturated and unsaturated organic acids have long been known. Among such may be mentioned the lead, cobalt, manganese, copper, zinc, calcium, nickel, iron and aluminum soaps of stearic, palmitic, oleic, linoleic, linolenic, eleostearic and clupanodonic acids and the like. The aluminum, calcium and zinc stearates and palmitates have found industrial application as water repellent coatings, as thickening agents for mineral and vegetable oils as in the production of lubricants or greases, for thickening paints or enamels so as to retard the settling of pigments, and as "flatting" agents in varnishes to produce matte or dull finishes. The soaps of the other metals have found varied other applications, those of lead, cobalt, manganese, iron, zinc and calcium particularly the first three, having been used extensively as driers or hardening agents for accelerating the drying and hardening of the natural drying oils and of paints, enamels and varnishes quite generally.

Normal paint and varnish products never contain more than a small percentage of the metallic soap, metallic soaps being used in the paint and varnish industry for stimulating or catalyzing oxidation and polymerization. Since unsaturated organic acid soaps may themselves become oxidized, the saturated organic acid soaps and also the naphthenates possess definite advantages. It will thus be observed that paint and varnish manufacturers have invariably restricted the use of these metallic soaps to minor proportions when utilizing them as a convenient means of introducing a catalytic metal in an oil-soluble form, or in the case of the non-catalytic metallic soaps, for the purpose of securing dull or flat finishes and to improve pigment suspension.

Aluminum stearates and palmitates have been used to some extent as waterproofing or water repellent substances for application to porous surfaces such as paper, textiles, concrete, plaster, etc. This restriction to porous surfaces having been necessitated by the fact that such soaps yield only soluble, fusible, soft or plastic coatings rather than hard or tough films and thus could be used only as impregnants where their physical deficiencies were obscured.

It has been recognized that various metallic soaps, such as those which are derived from unsaturated fatty acids, would readily undergo oxidation while in bulk with consequent deleterious effects upon the solubility. This is regarded as a serious defect and may be said to have influenced the widespread displacement of such soaps by the non-oxidizable naphthenate soaps.

The present invention is based upon the utilization of this property of oxidation possessed by certain soaps, although this oxidizability has previously been regarded as a serious defect which should be avoided by all means.

My experiments have shown that practically all of those soaps such as are derived from the unsaturated fatty acids of the natural drying oils are capable of undergoing oxidation upon exposure to the air and in consequence of which they must suffer some change of solubility and must exhibit a general tendency toward hardening or increase of softening point. But there are great differences of degree and since not all of these soaps become insoluble and film forming important variations and causes thereof must be recognized and appreciated before practical use becomes possible.

In general I have found that the mono- and many of the fixed divalent metals tend to yield soaps which are soluble but possess inferior film-forming properties even when derived from the unsaturated fatty acids, and the latter, although oxidizable, are not converted to the hard, infusible, insoluble state in sufficient degree upon exposure to the air. On the other hand excellent film-forming characteristics and convertibility to an infusible and insoluble form are observed to occur very readily when the soaps are derived from the same unsaturated acids and from metals whose existing or potential valency is three or more, as in the case of aluminum or iron.

Except in few instances it is highly desirable and in fact usually necessary to prepare very light colored or "water white" products for compositions having the widest commercial utility. From this standpoint as well as from the excellence of the results which are obtained, the aluminum compounds have generally been found to be most useful.

The aluminum soaps which are satisfactory for the practice of the present invention are chiefly those which are made from the fatty acids of linseed or of perilla oils but are not limited thereto inasmuch as one may substitute therefor, in whole, or more usually in part, the fatty acids of other drying or semi-drying oils such as soya bean, sunflower, safflower, tung, oiticica, menhaden, sardine, and the like, or of dehydroxylated castor oil fatty acids such as octadecadienic acid. The acids in general should contain two or more carbon to carbon double bonds as in linoleic, linolenic, octadecadienic, eleostearic acids and the like. Unsaturated acids of the type of oleic acid are generally unsuitable for my purpose. The use in part of oleic or of other types of unsaturated acids is, however, permissible provided that the proportions thereof are sufficiently limited so as not to impair the drying and film-forming characteristics of the mixed soaps.

Example No. 1

140 g. of linseed fatty acids is refluxed with 28 g. of potassium hydroxide in 300 cc. of ethanol for ½ hour. The solution is cooled and is added during one hour with vigorous agitation to a solution of 50 g. of aluminum chloride ($AlCl_3.6H_2O$) in 200 cc. of water. The aluminum soap is precipitated as a gummy mass. This mass is well washed with several portions of boiling water and finally dehydrated by heating at 150° C. in an open vessel in an atmosphere of carbon dioxide.

This aluminum soap is a stiff, plastic, resinous substance of light straw color. A solution in turpentine containing 15% by weight of the aluminum soap has a light straw color and a viscosity of 0.50 poises (25° C.). This solution is stable over a period of several months with no tendency to gel or to increase in viscosity. The concentration can be increased to at least 20%, gels being formed at 30% concentration.

Example No. 2

70 grams of dehydroxylated ricinoleic acid (9,11 octadecadienic acid) of redistilled and nearly water white grade and having an acid number of 191.5 and a Wijs iodine number of 149 is refluxed with 14 grams of potassium hydroxide in 120 cc. of ethanol for ½ hour. This is added (as in Example No. 1) to 25 gms. of aluminum chloride ($AlCl_3.6H_2O$( in 200 cc. of water. The aluminum soap is recovered in the anhydrous form and is observed to be a straw-colored, rubbery, transparent solid which upon exposure to the air oxidizes rapidly on the surface to form a hard crust. The unoxidized soap is found to be soluble in a mixture of equal parts of pine oil and of turpentine upon refluxing the same. A 10% solution gelled upon cooling. A 5% solution was of relatively low and stable viscosity.

Example No. 3

Example No. 1 was repeated substituting the free fatty acids of soya bean oil for those of linseed oil. The resulting product was very similar to that of the linseed soap and was easily soluble in turpentine to yield solutions of from 15 to 20% concentration.

Example No. 4

35 grams of 9,11 octadecadienic acid is refluxed with 7 grams of potassium hydroxide in 75 cc. of ethanol for ½ hour. The solution is cooled and is added during one hour with vigorous agitation to a solution of 20.2 gms. of ferric nitrate ($Fe(NO_3)_3.9H_2O$) in 100 cc. of water. The ferric soap is washed and then dehydrated by heating at 150° C. in an atmosphere of carbon dioxide. There is obtained a soft viscous or plastic substance of dark red color and yielding a solution of low viscosity when dissolved in turpentine at 20% concentration.

Example No. 5

The procedure of Example No. 4 is repeated, substituting 20.9 gms. of ferrous sulfate ($FeSO_4.7H_2O$) for the ferric salt. The ferrous soap is recovered in anhydrous form but is observed to undergo rapid conversion to the ferric form and to produce a material very similar to that of Example No. 4.

Aluminum and iron soaps are similarly made from other unsaturated fatty acids derived from the natural drying oils; that from aluminum and tung oil fatty acid (eleostearic acid) being a granular solid which oxidizes and polymerizes during its manufacture and becomes insoluble very rapidly unless special care is exercised to prevent this.

All of the foregoing metallic soaps are found to yield clear or transparent films of the insoluble and infusible type when their solutions are applied to various surfaces and are exposed to the air for from two to three days. The drying time is reduced to a few hours upon addition of 0.04 to 0.05% of cobalt naphthenate drier. This metallic drier has much the same effect on these metallic soaps as on linseed oil or other drying oils. This catalysis of the drying of one metal soap by another is an especially new and interesting phenomenon.

The drying of these soaps is likewise found to be tremedously accelerated by elevation of their temperature, very hard and well converted films resulting in from ½ to 1 hour at 125° C. without the use of catalytic promoters.

Both the drying speed and hardness of these products are greater than for linseed and similar drying oils, the film characteristics being more comparable to resin-oil combinations or varnishes than to oil films. The hardness, transparency and gloss which are especially great in the case of the linoleate (Example No. 1), are notable characteristics. Moreover the toughness and adhesion of these films when applied and tested over metal surfaces, both at elevated and at normal temperatures, together with the relatively high degree of water resistance are such as to enhance their practical value.

Moderate amounts of raw or of bodied drying oils and resins may be added or blended with the drying soaps in order to render the films softer and more distensible or to increase the thickness of the films by effectively raising the solids content of the solutions without undue increase of viscosity. Moreover such mixtures or the drying soaps alone may be blown with air or otherwise pre-oxidized to form tough and elastic bodies suitable for use in linoleum or in similar plastics.

The compositions of the present invention yield films and coatings which differ quite markedly from those which are obtained from the corresponding stearate and palmitate soaps. The latter are more water repellent but are of soft and waxy or opaque nature and remain both fusible and soluble in organic solvents such as turpentine and pine oil. The hardness, toughness, glossy and transparent nature and drying characteristics of the present compositions are therefore without parallel in the prior art of metallic soap coating compositions.

In place of aluminum or iron described in the specific examples, I may use other metals that can exist in a state of polyvalency equal to three or more. It will be evident that various soaps prepared from such metals or mixtures of them with the various fatty acids suitable for my purpose, will differ somewhat in their physical and chemical characteristics. These variations in properties may be utilized in adapting the soaps for the various purposes for which they may be used.

Solutions of the drying type of metallic soaps may be classed as varnishes and when suitably pigmented may be used as paints, inks or enamels. Such are to be distinguished from those of the prior art in that the metallic soap which is employed is of the oxidizable rather than of the non-oxidizable type and is used as a substantial or major film forming constituent rather than as a minor constituent used not as a film former but rather to produce flat finishes, to promote drying, pigment suspensions or for like purposes.

The use of certain metallic soaps as oxidation catalysts, pigment suspenders or flatting agents is decidedly foreign to the present invention and can have no connection therewith. In fact when such objects are to be served, the compositions of the present invention are to be treated by these same means just as are ordinary varnish and enamel products.

As solvents or thinners I prefer to use turpentine, dipentene, pine oil and related terpene hydrocarbons or derivatives. For convenience the term "hydrocarbon" will be used herein to designate not only the hydrocarbons which contain only hydrogen and carbon atoms but also the hydrocarbon derivatives which may contain other atoms. While certain other organic solvents may be used, such are generally less suitable and frequently yield solutions which are prone to gel. Small amounts of alcohols or of ethers may, however, be used advantageously at times as modifying solvents or diluents.

The compositions of the present invention are especially adapted for use as primers or paints for plaster or wall surfaces, for inexpensive air-dry and stoving varnishes and enamels for toys and similar objects, for printing and lithographing inks, road or other marking paints, barrel paints and for linoleum cements or plastics. The aluminum compounds are normally used but for some purposes, as in very dark colored or black finishes, the iron soaps may also be employed. Soaps of others of the more polyvalent metals may be used where their individual characteristics make them desirable.

Metallic soaps suitable for the present purposes may be made by any of the well known methods so long as the desired amount of metal is effectively combined and no restriction to the methods as exemplified is made.

What I claim is:

1. An air-drying, coherent film-forming coating composition comprising a solution including a fusible, hydrocarbon soluble, unoxidized and oxygen-convertible soap containing in chemical combination a metal that can exist in a state of polyvalency of at least 3 and a soap-forming fatty acid containing at least 2 carbon to carbon double bonds in the molecule, a hydrocarbon solvent for the soap and a catalytic oxidation promoter, the soap being present as the major film-forming constituent, films of said solution being convertible to substantially insoluble, substantially infusible varnish-like films through exposure to air.

2. An air-hardening, coherent film-forming coating composition comprising a solution including a fusible, hydrocarbon soluble, unoxidized and oxygen-convertible soap containing in chemical combination a metal that can exist in a state of polyvalency of at least 3 and the mixed fatty acids of a glyceride oil having drying properties, a hydrocarbon solvent for the soap and a catalytic oxidation promoter, the soap being present as the major film-forming constituent, films of said solution being convertible to substantially insoluble, substantially infusible varnish-like films through exposure to air.

3. A composition according to claim 1 in which the metal is aluminum.

4. A composition according to claim 2 in which the metal is aluminum.

5. A composition according to claim 2 in which the metal is aluminum and the fatty acids are the mixed fatty acids of linseed oil.

6. A composition according to claim 1 in which the metal is iron.

7. An air-hardening, coherent film-forming coating composition comprising a solution including at least one aluminum soap of a soap-forming fatty acid containing at least 2 carbon to carbon double bonds in the molecule, a hydrocarbon solvent for the soap, and a sufficient proportion of a soluble cobalt salt to promote the catalytic oxidation of the soap, the soap being present as the major film-forming constituent, films of said solution being convertible to substantially insoluble, substantially infusible varnish-like films through exposure to air.

THEODORE F. BRADLEY.